United States Patent [19]

D'Souza

[11] Patent Number: 5,365,863
[45] Date of Patent: Nov. 22, 1994

[54] REGENERATIVE THERMAL OXIDIZER WITH WOOD WASTE BURNER

[75] Inventor: Melanius D'Souza, San Dimas, Calif.

[73] Assignee: Smith Engineering Company, Ontario, Calif.

[21] Appl. No.: 184,863

[22] Filed: Jan. 21, 1994

[51] Int. Cl.$^5$ .......................... F23B 5/00; F27D 17/00
[52] U.S. Cl. ................................... 110/211; 110/342; 110/216; 432/181
[58] Field of Search ............... 110/304, 216, 211, 342; 432/179, 180, 181; 431/5

[56] References Cited

U.S. PATENT DOCUMENTS

| | | | |
|---|---|---|---|
| 4,604,051 | 8/1986 | Davies et al. | 431/166 |
| 4,650,414 | 3/1987 | Grenfell | 110/211 |
| 4,870,947 | 10/1989 | Kawamoto | 126/91 |
| 4,976,611 | 12/1990 | Knop et al. | 432/181 |
| 5,098,286 | 3/1992 | York | 432/181 |
| 5,134,945 | 8/1992 | Reimlinger et al. | 110/304 |
| 5,184,951 | 2/1993 | Nutcher et al. | 432/181 |
| 5,211,925 | 5/1993 | Houston | 423/235 |
| 5,221,522 | 6/1993 | Cash | 422/171 |
| 5,240,403 | 8/1993 | McAnespie | 431/5 |
| 5,279,235 | 1/1994 | Greco | 432/181 |
| 5,297,954 | 3/1994 | Colagiovanni | 110/211 |

Primary Examiner—Henry C. Yuen
Attorney, Agent, or Firm—Christie, Parker & Hale

[57] ABSTRACT

A regenerative thermal oxidation system is useful for treating a waste gas stream that contains volatile organic compounds. The volatile organic compounds are oxidized in an oxidation chamber. The heat and oxygen necessary to support the oxidation reactions is provided by a hot oxidation gas stream produced by the combustion of wood waste with excess air in a combustion chamber. The heat generated by the oxidation and combustion reactions is recovered in a plurality of regenerators. Any particulates in the hot oxidation gas stream are removed by a particulate removal system such as a cyclone separator or a high temperature filter. Preferably at least two regenerators containing heat exchange material are used to recover the heat from the oxidation reactions. The first regenerator is in heating service for heating the waste gas stream before it enters the oxidation chamber. The second regenerator is in cooling service for cooling the oxidized gas stream from the oxidation chamber by absorbing a portion of the heat generated by the oxidation and combustion reactions. Periodically the flow through the regenerators is reversed such that the cooling regenerator is switched to heating service and the heating regenerator is switched to cooling service.

20 Claims, 3 Drawing Sheets

REGENERATIVE THERMAL OXIDIZER WITH WOOD WASTE BURNER

BACKGROUND OF THE INVENTION

1. Field of the Invention

The present invention relates generally to regenerative thermal oxidizer systems for treating waste gas streams by oxidizing any volatile organic compounds that may be present. In particular, it relates to a system that uses wood waste as the fuel source for the oxidation reactions.

2. Description of the Related Art

Regenerative thermal oxidizer systems are useful for treating waste gas streams by destroying any volatile organic compounds that may be contained in such a waste gas stream. Such systems are increasingly important as ever stricter environmental regulations severely limit the levels of volatile organic compounds that may be released to the atmosphere.

It is well known to use regenerative thermal oxidizer systems with reversible gas flow in order to recapture heat that would otherwise be lost to the atmosphere. Regenerative thermal oxidizer systems generally include a heating regenerator containing refractory heat exchange material for preheating the gas stream to be treated, an oxidation chamber for oxidizing the volatile organic compounds or other combustible materials that may be present in the gas stream, and a cooling regenerator for cooling the oxidized gas stream before it is released to the atmosphere. Hydrocarbon fuels such as fuel gas or fuel oil are typically used as the fuel source that is supplied to the oxidation chamber to support the oxidation reactions.

After a period of time, the temperature of the heating regenerator starts to drop as heat is transferred to the gas stream. Similarly, the temperature of the cooling regenerator starts to rise as heat from the oxidized gas stream is transferred to the cooling regenerator. After a predetermined period of time has elapsed, and/or the regenerator temperatures reach predetermined limits, the flow of gas through the system is reversed so that the cooling regenerator is switched into heating service and the heating regenerator is switched into cooling service.

When the flow through a conventional two-regenerator regenerative thermal oxidizer system is reversed, an amount of untreated gas from the regenerator that was formerly in heating service passes through the system without being treated. This causes a spike in the emissions of volatile organic compounds that are released to atmosphere each time the regenerators are switched. In order to avoid this result, various modifications to regenerative thermal oxidizer systems have been developed. Some two-regenerator systems avoid spikes of emissions of volatile organic compounds during regenerator switching by using a system of bypass valves to purge the heating regenerator before it is switched into cooling service.

Another common modification uses three generators rather than two. In a three regenerator system the first regenerator is in heating service, the second regenerator is in cooling service and the third regenerator is in standby service. Once the temperatures of the heating and cooling regenerators have changed sufficiently, the cooling regenerator is switched to heating service, the standby regenerator is switched to cooling service and the heating regenerator is switched to standby service. While in standby service, the standby regenerator is purged of untreated gas by passing a flow of gas such as clean air or treated gas through that regenerator in order to drive any remaining untreated gas from it. The purged gas is generally recycled back to either the heating regenerator or directly to the oxidation chamber. An example of such a three-regenerator regenerative thermal oxidizer system is described in U.S. Pat. No. 5,026,277 to York.

Generally, it is desirable to use inexpensive and clean burning liquid or gaseous fuels such as fuel oil or natural gas as the fuel for the oxidation reactions in a regenerative thermal oxidizer. However, such fuels are not always readily available in all areas. Therefore, it is desirable in some circumstances to use an alternative fuel. Solid organic material such as wood waste in the form of hogged fuel, sawdust, planer shavings, sander dust or bark, can be inexpensive and readily available fuels that would be desirable for use as the fuel in a regenerative thermal oxidizer system.

Wood waste burners using such fuels are known and are currently used in the lumber processing industry. Such burners are often used as the energy source for lumber kilns. However, difficulties in handling solid fuels such as wood waste and the tendency for such fuels to produce solid combustion products in the form of ash or soot have generally made such fuels undesirable for use in regenerative thermal oxidizers.

An improved regenerative thermal oxidizer system is desired that is capable of cleanly and efficiently using solid organic fuel such as wood waste as the source of fuel.

SUMMARY OF THE INVENTION

The present invention relates to a process and system for treating a waste gas stream containing volatile organic compounds by using solid organic material such as wood waste as the fuel source. Solid organic material and air are mixed in a combustion chamber where the fuel is burned to generate heat. Excess air is fed to the combustion chamber so that the resulting exhaust contains excess oxygen making it useful as a hot oxidation gas steam. Any solid combustion products produced in the combustion chamber are removed from the hot oxidation gas stream by various methods. In one preferred embodiment, one or more cyclone separators are used to separate the solid combustion products from the hot oxidation gas stream. In another preferred embodiment, high temperature filters are use to filter the solid combustion products from the hot oxidation gas stream.

The hot oxidation gas stream is then produced to an oxidation chamber where it combines with the waste gas stream. When the volatile organic compounds from the waste gas stream combine with the hot oxidation gas, the volatile organic compounds are oxidized to carbon dioxide and water.

A plurality of regenerators are used to recover at least a portion of the heat generated by the oxidation reactions in the oxidation chamber. One regenerator is filled with a relatively hot heat refractory or heat exchange material and is used to preheat the waste gas stream before it enters the oxidation chamber. The oxidated gas stream from the oxidation chamber then flows through a second regenerator packed with relatively cool heat refractory or heat exchange material. This second regenerator cools the oxidated gas stream by absorbing its heat. A third regenerator is in standby service Over time, the first regenerator which is in heating servie starts to cool as the heat contained within its heat exchange material is transferred to the waste gas stream. Similarly the temperature of the second regenerator in cooling service starts to heat up as it absorbs the waste heat generated by the oxidation reactions. Once the temperatures of these two regenerators have changed such that the thermal efficiency is reduced, the regenerators are switched to new service. The cooling regenerator is switched into heating service, the standby regenerator is switched into cooling service, and the heating regenerator is switched to standby service. While in standby service this regenerator is purged of any untreated gas that it may contain.

By this method, solid organic material such as wood waste can be used as the fuel to support oxidation of the volatile organic compounds present in a waste gas stream. This process provides a means for treatment that is both energy and cost efficient. The resulting treated gas produced by the process can be released to atmosphere as most of the volatile organic compounds will have been destroyed.

BRIEF DESCRIPTION OF THE DRAWINGS

The features and aspects of the present invention are more clearly set forth in the following description of the invention and in the drawings, wherein.

DETAILED DESCRIPTION

Figure 1:
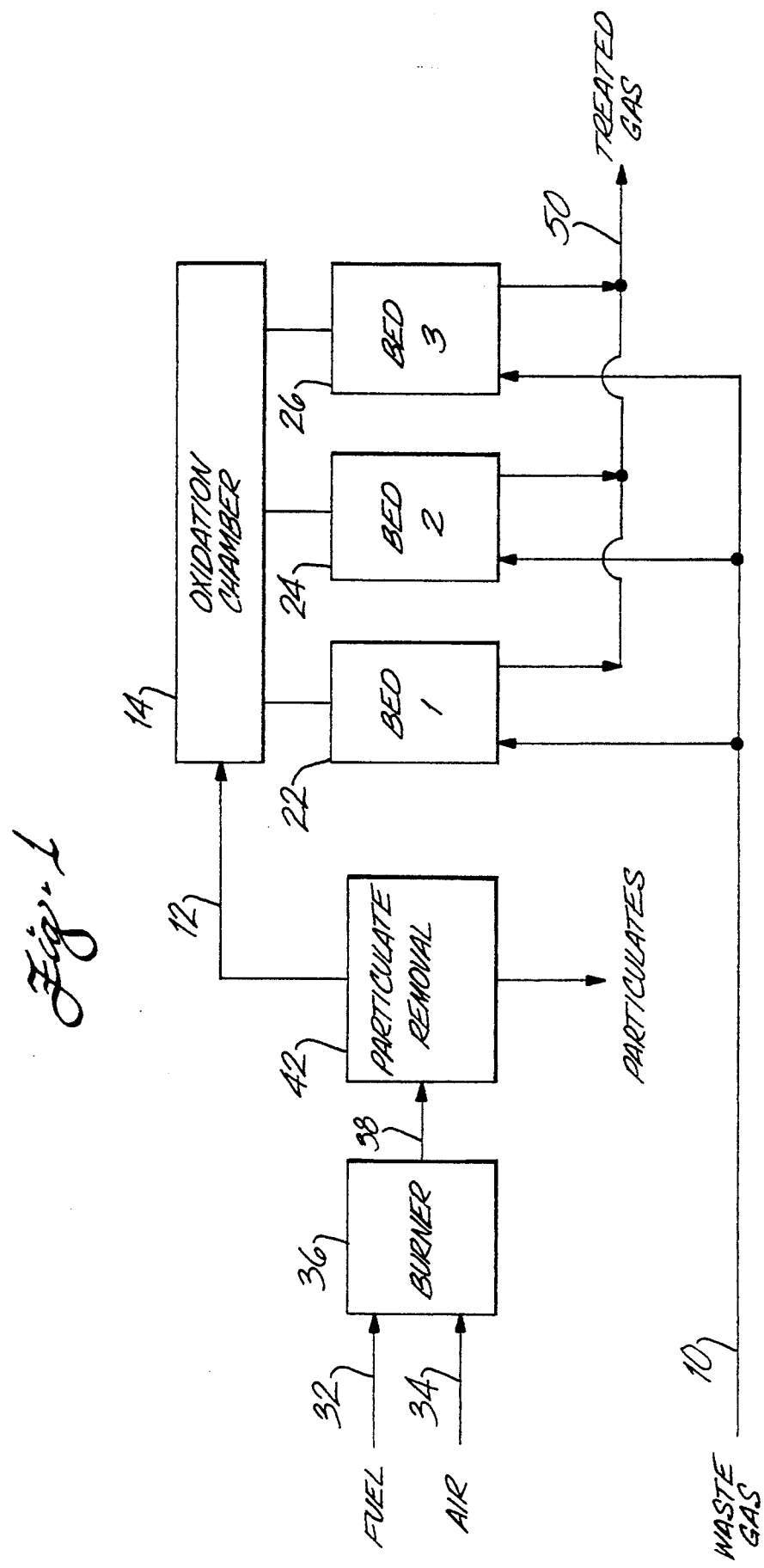
FIG. 1 is a process flow diagram illustrating the steps of the invention.

Referring to FIG. 1, a block flow diagram is presented to illustrate the steps of the process of the present invention. A waste gas stream 10 is treated for removal of any volatile organic compounds it may contain by oxidation of those compounds to carbon dioxide and water. This is performed by combining the waste gas stream with a hot oxidation gas stream 12 in an oxidation chamber 14 for incineration of the volatile organic compounds. In order to improve the thermal efficiency of the process, a number of regenerators are used to recover the heat generated by the exothermic oxidation reactions in the oxidation chamber as well as the heat contained in the hot oxidation gas stream. In the preferred embodiment, first, second and third regenerators 22, 24 and 26 are used to recover this heat.

The heat necessary to support the oxidation reactions is provided in part by the combustion of the volatile organic compounds present. This heat is supplemented by the combustion of fuel 32 comprising solid organic material such as waste wood. Examples of such waste wood include hogged fuel, sawdust, planer shavings, sander dust, and bark. Any wood waste that has a particle size less than about one-eighth of an inch may be used. The fuel combines with air 34 in a combustion chamber or burner 36 where the fuel is oxidized to generate heat. Excess air is provided in order to supply the oxygen necessary for supporting the oxidation reactions in the oxidation chamber. The exhaust from the burner is a hot oxidation gas stream which contains some particulates in the form of soot or ash. These solid particulates are removed by a particulate removal system 42. Once the particulates have been removed, the hot oxidation gas stream can be fed to the oxidation chamber for treatment of the waste gas. After the waste gas has been treated, the treated gas 50 from the oxidation chamber is released to atmosphere.

Figure 2:
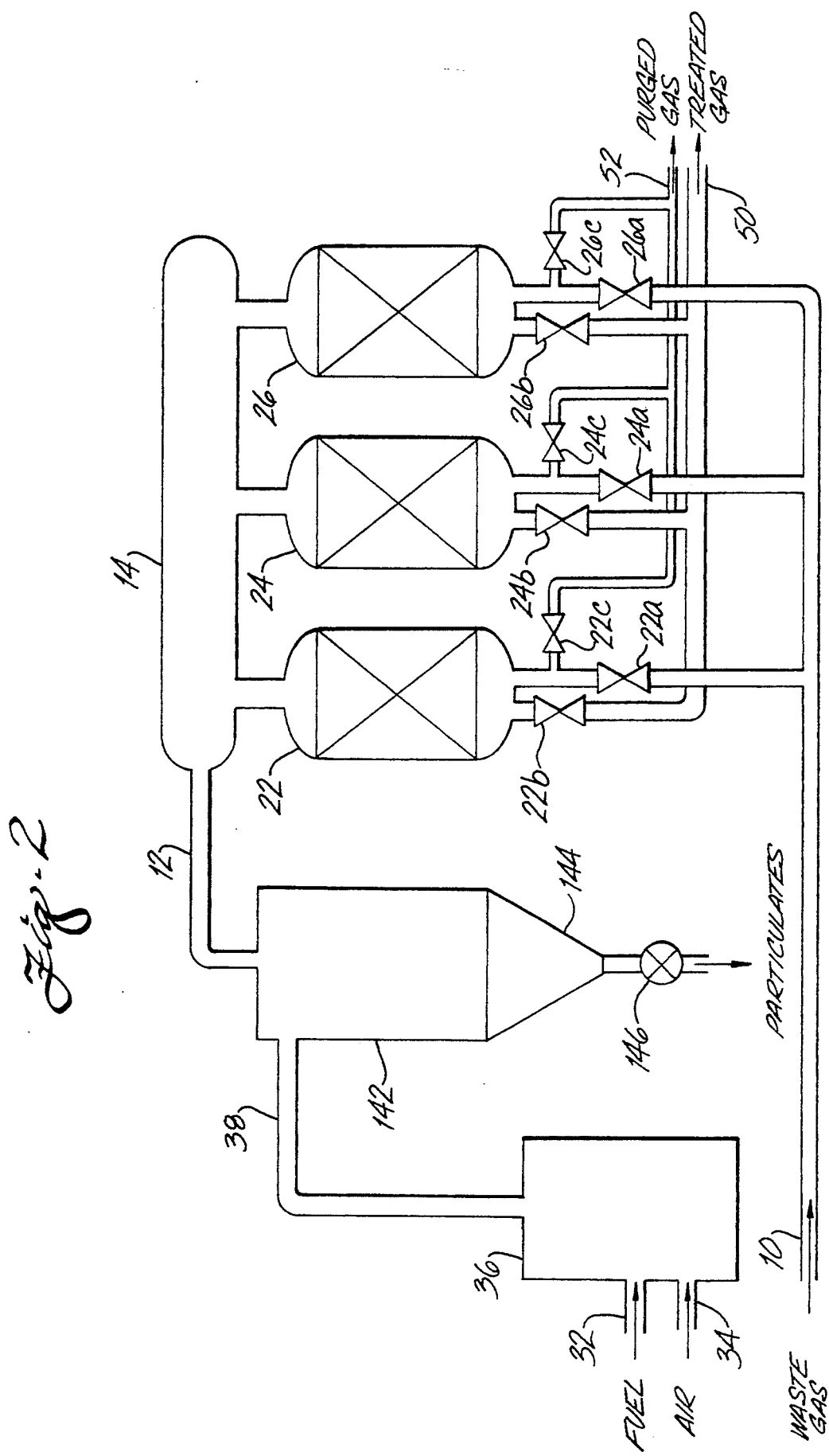
FIG. 2 is a process flow diagram illustrating a preferred embodiment of the invention.
Figure 3:
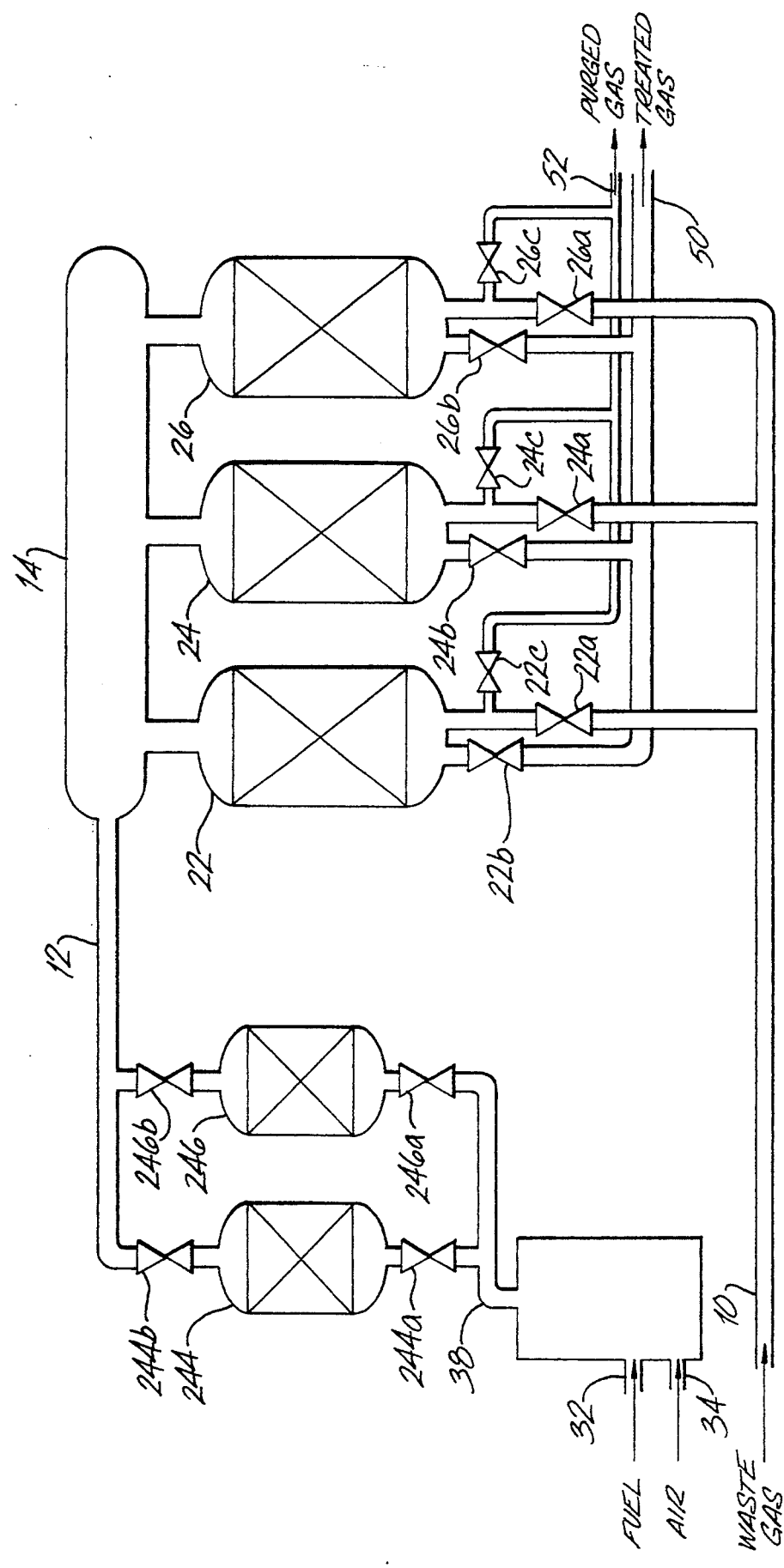
FIG. 3 is a process flow diagram illustrating another preferred embodiment of the invention.

Referring to FIGS. 2 and 3, the details of the operation of the first, second and third regenerators 22, 24 and 26 are illustrated. Each regenerator contains heat exchange material which is used to absorb heat generated by the oxidation reaction. Such heat exchange material is well known in the art. Waste gas 10 flows into regenerator 22 through inlet valve 22a and is preheated by heat exchange material found in the first regenerator. The preheated waste gas then flows into oxidation chamber 14 where it combines with the hot oxidation gas stream 12 for oxidation of the volatile organic compounds present in the waste gas stream. The oxidized gas stream then flows into the second regenerator 24 where relatively cool heat exchange material contained within that regenerator cools the hot oxidized gas stream by absorbing the energy it contains. The treated gas flows through outlet valve 24b into treated gas conduit 50 where it can then be released to atmosphere. The third regenerator 26 is in standby service.

Over time, as the waste gas stream is heated by the first regenerator which is in heating service, the temperature of the heat exchange material in that regenerator starts to drop. Similarly, the temperature of the second regenerator which is in cooling service starts to rise as heat is transferred from the oxidized gas to the heat exchange material within that regenerator. After a predetermined period of time has elapsed or when the regenerator temperatures have changed by a predetermined amount, a second cycle is initiated in which the services of the three regenerators are switched. This is done in order to recover the heat generated by the exothermic oxidation reactions and use that heat for preheating the waste gas to be treated.

In the second cycle, the second regenerator that was formerly in cooling service is switched to heating service, the third regenerator that was formerly in standby service is switched to cooling service and the first regenerator that was formerly in heating service is switched to standby service. In order to prevent the release of any untreated gas, the first regenerator which is now in standby service is purged of untreated gas by a portion of the oxidized gas stream which flows down from the oxidation chamber through the regenerator and into purged gas conduit 52. Preferably, the purged gas is then recycled back to the oxidation chamber though air inlet 34 or directly into the hot oxidation gas stream 12.

A system of inlet valves 22a, 24a and 26a, outlet valves 22b, 24b and 26b, and purge valves 22c, 24c and 26c, are used to coordinate the rotating service of the regenerators. For the first cycle described above, inlet valve 22a is opened allowing the waste gas stream to flow into the first regenerator 22 which is in heating service while inlet valves 24a and 26a to the other regenerators are closed. The oxidized gas from the oxidation chamber then flows through the second regenerator 24 which is in cooling service and through outlet valve 24b to treated gas conduit 50, while outlet valves 22b and 26b for the other regenerators are closed. The third regenerator 26 receives a portion of the oxidized gas which flows from that regenerator through purge valve 26c while the purge valves 22c and 24c for the other regenerators are closed. This flow of oxidized gas is used to purge the regenerator of any untreated gas while it is standby service before it is switched to cooling service.

Once the temperature of the heating regenerator has substantially dropped and the temperature of the cooling regenerator has substantially risen, the second cycle is started. In this cycle, cooling regenerator 24 is switched to heating service, standby regenerator 26 is switched to cooling service and heating regenerator 22 is switched to standby service. This is effected by opening gas inlet valve 24a, gas outlet valve 26b, and purge valve 22c, and closing gas inlet valve 22a, gas outlet valve 24b and purge valve 26c. Valves 26a, 22b and 24c remain closed.

Likewise, once the regenerator temperatures have changed substantially during the second cycle, a third cycle is started in which the cooling regenerator 26 is switched to heating service, the standby regenerator 22 is switched to cooling service and the heating regenerator 24 is switched to standby service. Valves 26a, 22b and 24c are opened, valves 24a, 26b and 22c are closed, and valves 22a, 24b and 26c remain closed. These three cycles are repeated periodically in accordance with the temperature changes of the regenerators.

While the oxidation of the volatile organic compounds provides a source of heat for the reactions, additional heat is necessary. In the present invention, solid organic fuel such as wood waste 32 is fed to combustion chamber 36 for combustion to supplement the heat from oxidation of the volatile organic compounds. A stream of air 34 is also fed to the combustion chamber in order to provide the oxygen necessary to burn the wood waste. Excess air is provided to produce a hot oxidation gas stream to the oxidation chamber 14 for oxidation of the volatile organic compounds in the waste gas stream.

When burning a solid fuel, certain solid combustion products such as soot or ash may form. If the solid products were allowed to flow into the oxidation chamber and through the regenerators, the regenerators would tend to clog. This would significantly reduce the run time for a given system. In order to prevent the regenerators from clogging, various methods of particulate removal may be used.

In one preferred embodiment as illustrated in FIG. 2, a cyclone separator 142 is used to remove any particulates that may be present in the oxidation gas stream. Cyclone separators are well known and generally comprise a pressure vessel into which the gas stream containing particulates 38 is directed in a tangential direction to cause cyclonic flow within the vessel. The particulates which are heavier than the gas in which they are entrained are forced against the outer walls of the cyclone and fall downward into a hopper section 144 of the cyclone. From the hopper section the particulates can be removed through hopper valve 146. Meanwhile, the hot oxidized gas stream from which the particulates have been removed flows from the top of the cyclone into hot oxidation gas conduit 12 where it is produced into the oxidation chamber.

While only a single cyclone separator is illustrated, several cyclone separators may be used in series or parallel to improve separation efficiency. In order to preserve the heat generated in the burner, the cyclone separators and any related conduits are well insulated.

In another preferred embodiment, as illustrated in FIG. 3, a pair of high temperature filters 244 and 246 are used to remove particulates from the hot oxidation gas stream. Each filter is a pressure vessel containing a packed bed of suitable filtering media such as gravel or ceramic balls, rings or saddles. Over time, as the particulates are removed, the high temperature filters tend to clog with the solid combustion products. By including a pair of high temperature filters, one filter can be taken out of service while the other continues to filter solids from the hot oxidation gas stream. Isolation valves 244a and 244b on the first filter can be used to stop flow through the first filter and allow the particulates to be removed by various methods. The particulates can be removed by back flushing a flow of gas or liquid through the filter, or by physically removing the packing material and replacing it with fresh packing material. Similarly, isolation valves 246a and 246b can be used to take the second filter 246 out of service.

While two filters are shown, any number of filters can be used in parallel to insure that one or more filters can be taken out of service while the remaining filters effectively remove the particulates from the hot oxidation gas stream. As with cyclone separators, the high temperature filters and their related conduits are well insulated to reduce heat loss from the hot oxidation gas stream.

Having now describing the invention in detail, those skilled in the art will recognize modifications and substitutions to the embodiments identified in the specification which can be used to meet specific operational requirements. Such modifications and substitutions are intended to be within the scope of the invention as defined by the following claims.

What is claimed is:

1. A system for removing volatile organic compounds from a waste gas stream comprising:
    a combustion chamber for burning a fuel stream containing solid organic material with excess oxygen to produce a hot oxidation gas stream;
    means for removing particulates from the hot oxidation gas stream;
    two regenerators, each containing heat exchange material;
    means for selectively directing the waste gas stream to a regenerator in heating service for preheating the waste gas stream;
    an oxidation chamber in open communication with the regenerators for oxidizing the volatile organic compounds in the waste gas stream with the hot oxidation gas stream to produce an oxidized waste gas stream; and means for selectively drawing the oxidized waste gas stream from the oxidation chamber through a regenerator in cooling service for cooling the oxidized waste gas stream.

2. The system of claim 1 further comprising means for switching service of the regenerators such that the regenerator in heating service is switched to cooling service and the regenerator in cooling service is switched to heating service.

3. The system of claim i further comprising:
    a third regenerator in purge service;
    means for selectively purging the regenerator in purge service of any waste gas; and
    means for selectively switching the service of the regenerators such that the regenerator in heating service is switched to purge service, the regenerator in cooling service is switched to heating service, and the regenerator in purge service is switched to cooling service.

4. The system of claim 1 wherein the means for removing particulates from the hot oxidation gas stream comprises a cyclone separator.

5. The system of claim 1 wherein the means for removing particulates from the hot oxidation gas stream comprises a high temperature filter.

6. The system of claim 5 wherein the high temperature filter comprises a vessel containing a bed of packing material.

7. The system of claim 6 wherein the packing material is ceramic.

8. The system of claim 6 wherein the packing material is gravel.

9. The system of claim 5 wherein the high temperature filter is a first high temperature filter and the means for removing particulates further comprises a second high temperature filter.

10. The system of claim 9 further comprising switching means for selectively taking one of said first and second high temperature filters out of service for particulate removal.

11. The system of claim 10 wherein the switching means comprises a plurality of valves for isolating the first and second high temperature filters from one another.

12. A method for removing volatile organic compounds from a waste gas stream comprising the steps of:
burning a fuel stream containing solid organic material with excess oxygen to produce a hot oxidation gas stream;
removing particulates from the hot oxidation gas stream;
preheating the waste gas stream by directing it through a first regenerator in heating service and containing heat exchange materials to produce a preheated waste gas stream;
oxidizing the volatile organic compounds in the preheated waste gas stream with the hot oxidation gas stream to produce an oxidized waste gas stream; and
cooling the oxidized waste gas stream by drawing it through a second regenerator in cooling service and containing heat exchange materials.

13. The method of claim 12 further comprising the step of periodically switching service of the regenerators such that the regenerator in heating service is switched to cooling service and the regenerator in cooling service is switched to heating service.

14. The method of claim 12 further comprising the steps of:
purging a third regenerator in purge service of any waste gas; and
periodically switching the service of the regenerators such that the regenerator in heating service is switched to purge service, the regenerator in cooling service is switched to heating service and the regenerator in purge service is switched to cooling service.

15. The method of claim 12 wherein the fuel stream comprises wood waste.

16. The method of claim 12 wherein the step for removing particulates from the hot oxidation gas stream comprises passing the hot oxidation gas stream through a cyclone separator.

17. The method of claim 12 wherein the step for removing particulates from the hot oxidation gas stream comprises passing the hot oxidation gas stream through a high temperature filter.

18. The method of claim 17 wherein the high temperature filter is one of a plurality of high temperature filters and the method further comprises the steps of:
periodically taking a high temperature filter out of service by switching the flow of the hot oxidation gas stream to another high temperature filter; and
removing the particulates from the high temperature filter that was taken out of service.

19. The method of claim 12 wherein the step for removing particulates from the hot oxidation gas stream comprises passing the hot oxidation gas stream through a pressure vessel packed with ceramic material.

20. The method of claim 12 wherein the step for removing particulates from the hot oxidation gas stream comprises passing the hot oxidation gas stream through a vessel packed with gravel.

* * * * *

UNITED STATES PATENT AND TRADEMARK OFFICE
CERTIFICATE OF CORRECTION

PATENT NO. : 5,365,863
DATED : November 22, 1994
INVENTOR(S) : Melanius D'Souza

It is certified that error appears in the above-indentified patent and that said Letters Patent is hereby corrected as shown below:

Column 2, line 44, change "steam" to -- stream --.

Column 2, line 51, change "use" to -- used --.

Column 3, line 4, change "servie" to -- service --.

Column 6, line 26, change "describing" to -- described --.

Column 6, line 59, change "claim i" to -- claim 1 --.

Signed and Sealed this

Fifth Day of September, 1995

*Attest:*

BRUCE LEHMAN

*Attesting Officer*     *Commissioner of Patents and Trademarks*